US012638905B2

(12) United States Patent
You

(10) Patent No.: US 12,638,905 B2
(45) Date of Patent: May 26, 2026

(54) MOBILE CONNECTIVITY DEVICE WAKE DETECTION AND DIAGNOSIS

(71) Applicant: Microsoft Technology Licensing, LLC, Redmond, WA (US)

(72) Inventor: Yang You, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 160 days.

(21) Appl. No.: 18/759,782

(22) Filed: Jun. 28, 2024

(65) Prior Publication Data

US 2026/0003417 A1 Jan. 1, 2026

(51) Int. Cl.
*G06F 1/00* (2006.01)
*G06F 1/3234* (2019.01)
*H04W 88/02* (2009.01)

(52) U.S. Cl.
CPC ........... *G06F 1/3234* (2013.01); *H04W 88/02* (2013.01)

(58) Field of Classification Search
CPC .............................. G06F 1/3234; H04W 88/02
See application file for complete search history.

(56) References Cited

U.S. PATENT DOCUMENTS

| | | | | |
|---|---|---|---|---|
| 10,098,067 | B2 * | 10/2018 | Qi ......................... | H04W 76/27 |
| 10,681,638 | B2 * | 6/2020 | Kim .................. | H04W 52/0261 |
| 2013/0100944 | A1 * | 4/2013 | Kwon ................. | H04W 52/028 |
| | | | | 455/41.2 |
| 2015/0312857 | A1 * | 10/2015 | Kim .................. | H04W 52/0222 |
| | | | | 370/311 |
| 2017/0070953 | A1 * | 3/2017 | Kim ....................... | H04L 63/08 |
| 2020/0077335 | A1 * | 3/2020 | Perahia ............. | H04W 52/0229 |
| 2020/0229090 | A1 * | 7/2020 | Kim .................. | H04W 52/0229 |

* cited by examiner

*Primary Examiner* — Xuxing Chen

(57) ABSTRACT

Systems and methods are provided for implementing mobile connectivity device wake detection and diagnosis. After detecting that a mobile connectivity device on a device has been awakened, an operating system ("OS") control message support driver running on an OS determines a cause of awakening of the mobile connectivity device. The determined cause of awakening of the mobile connectivity device includes one of a control path reason, a firmware-based reason, a data path reason, or a peripheral component interconnect ("PCI") bus-based reason. Based on each of these determined causes of awakening of the mobile connectivity device, a corresponding report (e.g., a control path wake reason report, a firmware-based wake reason report, a data path wake reason report, or a PCI bus-based wake reason report) is sent for further action (e.g., analysis of the wake reasons for subsequent system updates or patches to address the underlying issues associated with the wake reasons).

20 Claims, 7 Drawing Sheets

300

Ⓑ

Log, using the OS control message support driver and in a sleep study report that is stored in a local software trace preprocessor, results contained in at least one of the first report, the second report, the third report, or the fourth report

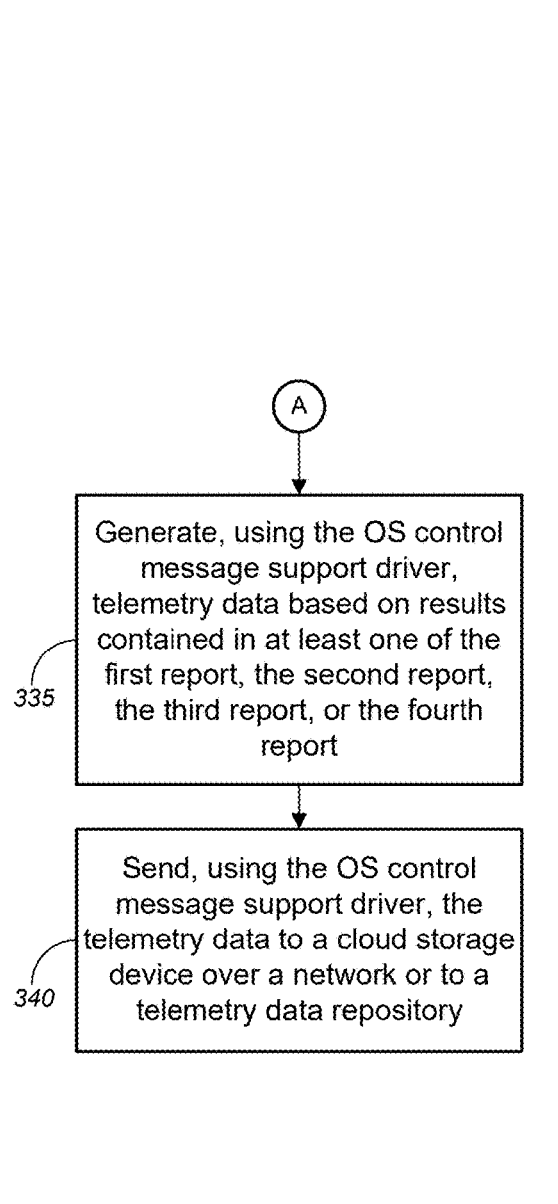

Ⓐ

Generate, using the OS control message support driver, telemetry data based on results contained in at least one of the first report, the second report, the third report, or the fourth report

335

Send, using the OS control message support driver, the telemetry data to a cloud storage device over a network or to a telemetry data repository

Cause, using the OS control message support driver, the OS to initiate preset actions in response to information contained in at least one of the first report, the second report, the third report, the fourth report, the mobile connectivity adapter report, or the net adapter report

Detect, using a first driver running on an OS of a computing system, that the mobile connectivity chipset has been awakened from a sleep state

405

Determine a cause of awakening of the mobile connectivity chipset
410

A    B    C

Control Path Reason

Send, using the first driver, a first report indicating that the mobile connectivity chipset was awakened based on the control path reason

415

Firmware-based Reason

Send, using the first driver, a second report indicating that the mobile connectivity chipset was awakened based on the firmware-based reason

420

Data Path Reason

Send, using the first driver, a third report indicating that the mobile connectivity chipset was awakened based on the data path reason

425

None of Control Path Reason, Firmware-based Reason, or Data Path Reason

Send, using the first driver, a fourth report indicating that the mobile connectivity chipset was awakened due to another device on a common PCI bus having been awakened

430

400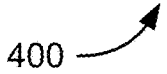

Fig. 4A

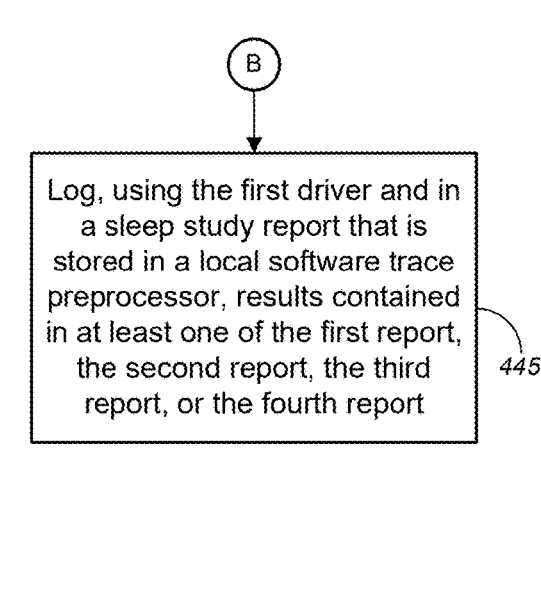

Ⓑ

Log, using the first driver and in a sleep study report that is stored in a local software trace preprocessor, results contained in at least one of the first report, the second report, the third report, or the fourth report — 445

400 ⟋ Fig. 4C

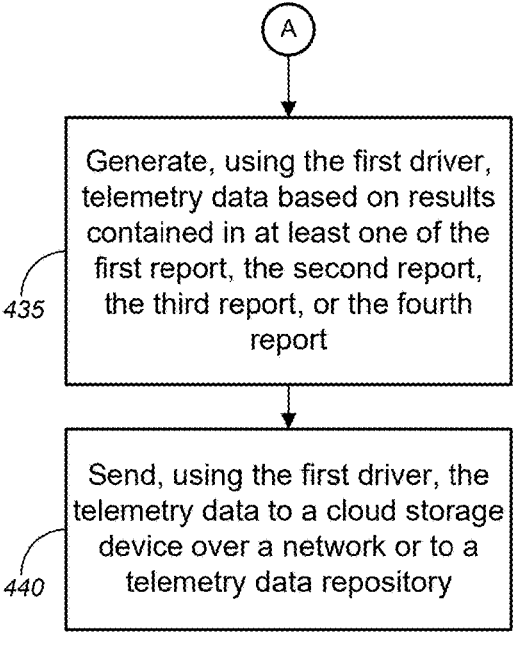

Ⓐ

Generate, using the first driver, telemetry data based on results contained in at least one of the first report, the second report, the third report, or the fourth report — 435

Send, using the first driver, the telemetry data to a cloud storage device over a network or to a telemetry data repository — 440

Cause, using the first driver, the OS to initiate preset actions in response to information contained in at least one of the first report, the second report, the third report, the fourth report, the mobile connectivity adapter report, or the net adapter report — 450

400 ⟋ Fig. 4D

MOBILE CONNECTIVITY DEVICE WAKE DETECTION AND DIAGNOSIS

BACKGROUND

Some mobile connectivity chipsets (e.g., Wi-Fi chipsets) may be susceptible to high counts of suspicious wake during modern standby sessions. For battery-powered user devices, such suspicious wake instances result in bad battery performance. It is with respect to this general technical environment to which aspects of the present disclosure are directed. In addition, although relatively specific problems have been discussed, it should be understood that the examples should not be limited to solving the specific problems identified in the background.

SUMMARY

This summary is provided to introduce a selection of concepts in a simplified form that are further described below in the detailed description section. This summary is not intended to identify key features or essential features of the claimed subject matter, nor is it intended as an aid in determining the scope of the claimed subject matter.

The currently disclosed technology, among other things, provides for implementing mobile connectivity device wake detection and diagnosis. After detecting that a mobile connectivity device (e.g., a Wi-Fi chipset or a mobile broadband chipset) on a device has been awakened, an operating system ("OS") control message support driver running on an OS of the device determines a cause of awakening of the mobile connectivity device. In examples, determination of the cause of awakening is based on information that is accessed from a mobile connectivity adapter report, a net adapter report, and/or a sleep study report. The information is based on wake reasons that are obtained from a mobile connectivity chipset driver associated with the mobile connectivity device and that are used to update one or more of the mobile connectivity adapter report, the net adapter report, and/or the sleep study report. The determined cause of awakening of the mobile connectivity device includes one of a control path reason, a firmware-based reason, a data path reason, or a peripheral component interconnect ("PCI") bus-based reason. Based on each of these determined causes of awakening of the mobile connectivity device, a corresponding report (e.g., a control path wake reason report, a client diagnostic wake reason report, a data path wake reason report, or a PCI bus-based wake reason report) is sent for further action (e.g., analysis of the wake reasons for subsequent system updates or patches to address the underlying issues associated with the wake reasons).

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

A further understanding of the nature and advantages of particular embodiments may be realized by reference to the remaining portions of the specification and the drawings, which are incorporated in and constitute a part of this disclosure.

FIGS. 3A-3D depict an example method for implementing mobile connectivity device wake detection and diagnosis.

FIGS. 4A-4D depict another example method for implementing mobile connectivity device wake detection and diagnosis.

DETAILED DESCRIPTION OF CERTAIN EMBODIMENTS

As briefly discussed above, some mobile connectivity chipsets (e.g., Wi-Fi chipsets) may be susceptible to high counts of suspicious wake instances during modern standby sessions. For battery-powered user devices, such suspicious wake instances result in bad battery performance. However, there are no existing mobile connectivity chipset battery saver issue triage flows, nor is there the ability, to perform quick triage of battery saver issues associated with suspicious wake triggers for mobile connectivity chipsets.

The present technology provides for implementing mobile connectivity device wake detection and diagnosis, which resolves suspicious wake triggers by enabling quick triage of wake reasons that trigger awakening of mobile connectivity devices or chipsets, including quick triage of battery saver issues associated with suspicious wake triggers. In this manner, timely and accurate classification and investigation into issues related to standby performance or wake triggers for mobile connectivity devices can be implemented and appropriate reports can be sent to corresponding teams to perform further action (e.g., analysis of the wake reasons for subsequent system updates or patches to address the underlying issues associated with the wake reasons). These are described in detail below with respect to the figures.

Various modifications and additions can be made to the embodiments discussed herein without departing from the scope of the disclosed techniques. For example, while the embodiments described above refer to particular features, the scope of the disclosed techniques also includes embodiments having different combinations of features and embodiments that do not include all of the above-described features.

Turning to the embodiments as illustrated by the drawings, FIGS. 1-5 illustrate some of the features of methods, systems, and apparatuses for implementing mobile connectivity device wake detection and diagnosis, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

Figure 1:
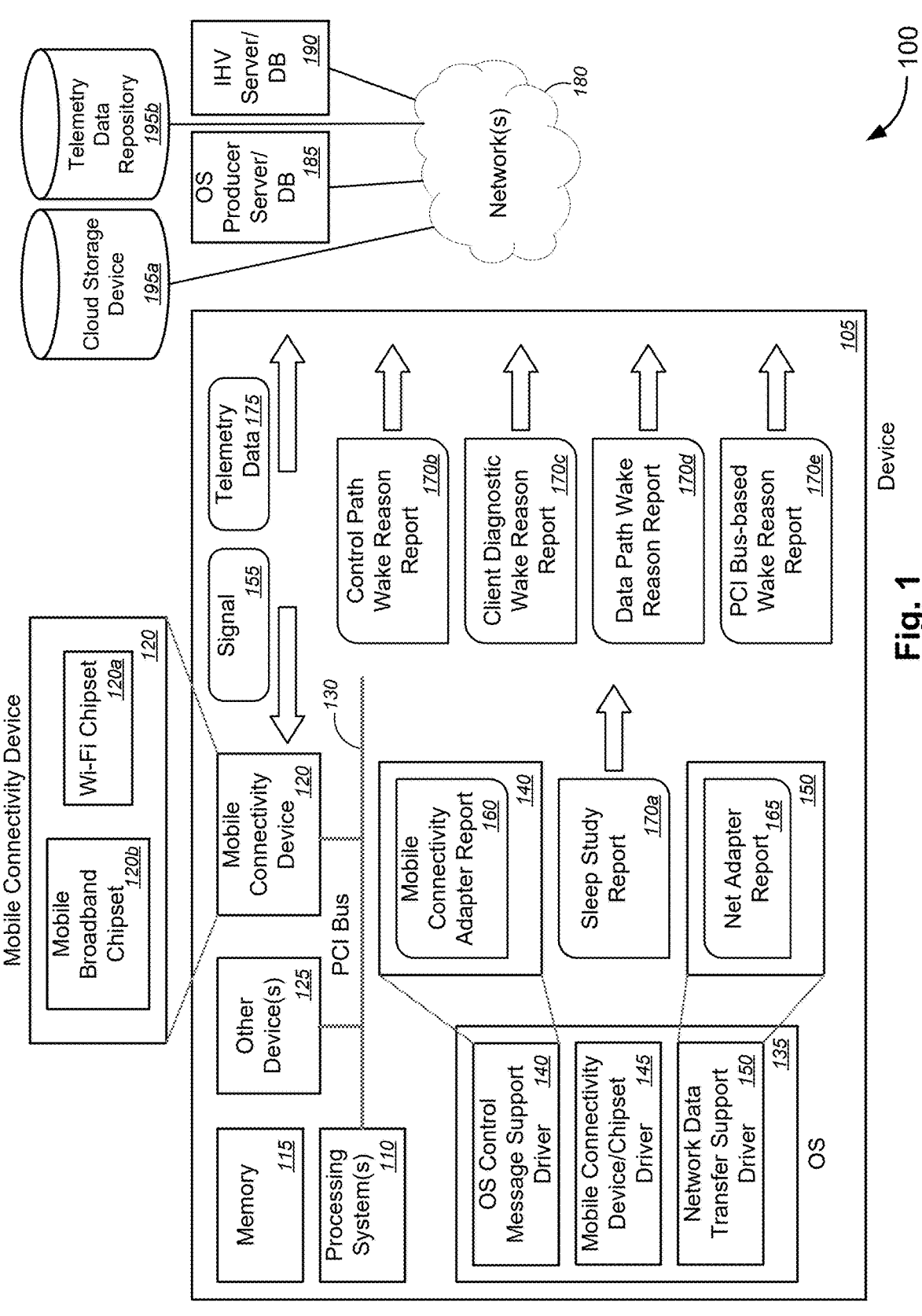
FIG. 1 depicts an example system for implementing mobile connectivity device wake detection and diagnosis.

FIG. 1 depicts an example system 100 for implementing mobile connectivity device wake detection and diagnosis. System 100 includes a device 105, a processing system(s) 110, a memory device 115, a mobile connectivity device 120, and one or more other devices 125. In an example, the mobile connectivity device 120 is connected with the one or more other devices 125 and with the processing system(s) 110 via a shared or common PCI bus 130. In examples, the mobile connectivity device 120 includes either a Wi-Fi chipset 120a and/or a mobile broadband chipset 120b. On the device 105 is an OS 135 on which various drivers are run. In some examples, the various drivers include an OS control message support driver 140, a mobile connectivity device or chipset driver 145 (hereinafter referred to as "mobile connectivity chipset driver 145"), and a network data transfer support driver 150. In examples, the device 105 includes one of a smart phone, a mobile phone, a tablet computer, a desktop computer, a handheld gaming device, a gaming console, a server, or any suitable device that has wireless communication capability via a mobile connectivity device (e.g., mobile connectivity device 120).

Figure 2:
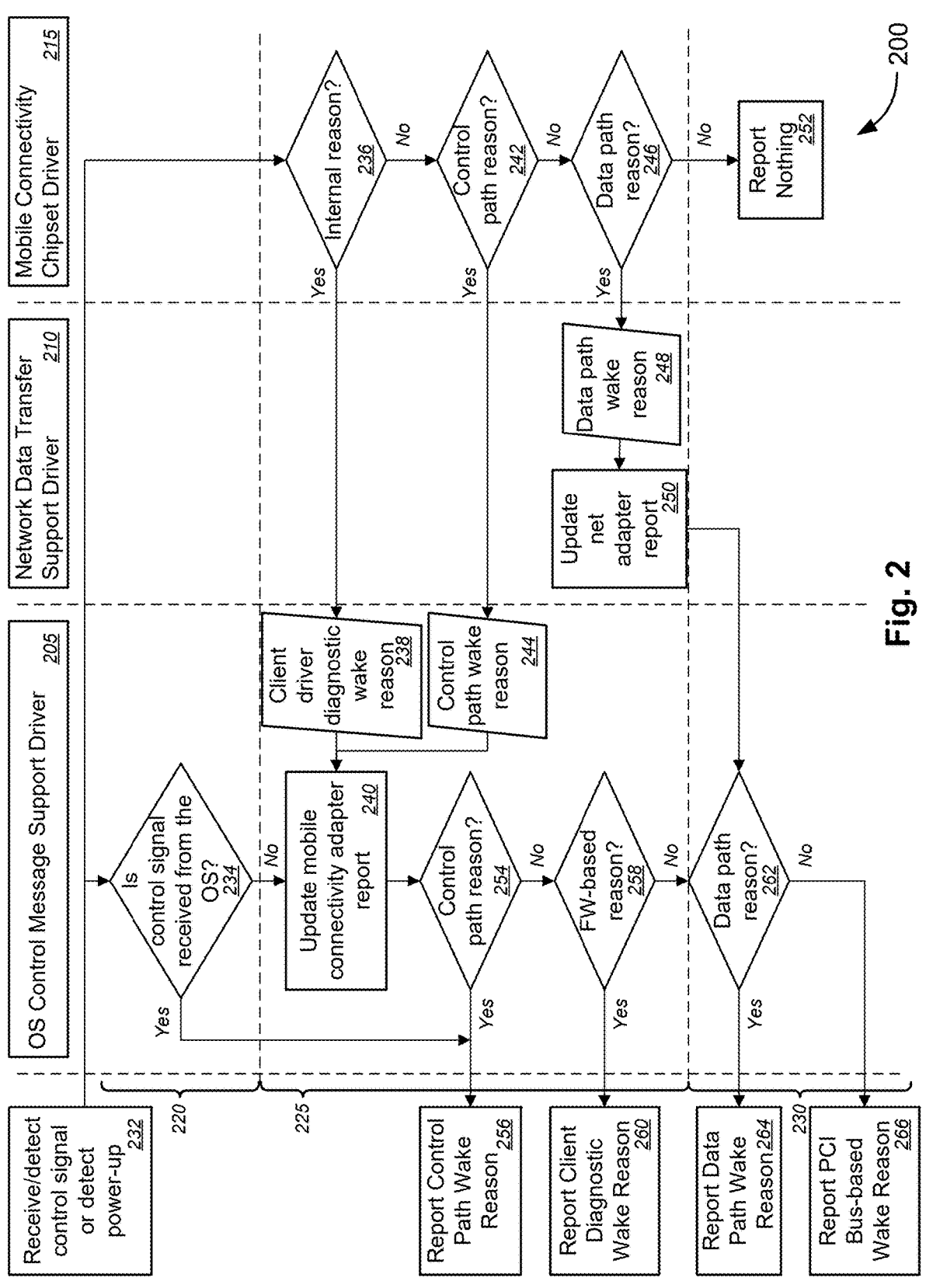
FIG. 2 depicts an example sequence flow for implementing mobile connectivity device wake detection and diagnosis.

In operation, after receiving or detecting a signal 155, the mobile connectivity device 120 is awakened from a sleep state or is otherwise powered-up. The OS control message support driver 140 running on OS 135 detects power-up of the mobile connectivity device 120 or that the mobile connectivity device has been awakened from a sleep state, and determines a cause of awakening of the mobile connectivity device 120. In determining the cause of awakening of the mobile connectivity device 120, the OS control message support driver 140 receives data, messages, or signals (collectively, "wake reason data") from (or otherwise communicates with) mobile connectivity chipset driver 145 and/or network data transfer support driver 150, both of which are also running on the OS 135. In examples, wake reason data pertaining to control path reasons and/or internal chipset or device reasons that are received by the OS control message support driver 140 from the mobile connectivity chipset driver 145 are used to update a mobile connectivity adapter report 160. In some examples, wake reason data pertaining to data path reasons that are received by the network data transfer support driver 150 from the mobile connectivity chipset driver 145 are used to update a net adapter report 165. In examples, data obtained from the mobile connectivity adapter report 160 and/or from the net adapter report 165 are used by the OS control message support driver 140 to determine whether the wake reason is based on a control path wake reason, a client diagnostic wake reason (also referred to herein as internal chipset or device wake reasons), a data path wake reason, or a PCI bus-based wake reason. In an example, a sleep study report 170a is updated with results of such determination. In another example, a control path wake reason report 170b is updated with results pertaining to or based on the control path wake reason. Similarly, a client diagnostic wake reason report 170c (also referred to as a "firmware-based wake reason report") is updated with results pertaining to or based on the client diagnostic wake reason. Likewise, a data path wake reason report 170d is updated with results pertaining to or based on the data path wake reason. In yet another example, based on a determination that the cause of awakening of the mobile connectivity device 120 is none of the control path wake reason, the client diagnostic wake reason, or the data path wake reason, a PCI bus-based wake reason report 170e is updated with results pertaining to or based on the PCI bus-based wake reason. FIG. 2 illustrates an example sequence flow 200 covering determinations of the cause of awakening of the mobile connectivity device or chipset.

In some examples, at least one of the sleep study report 170a, the control path wake reason report 170b, the client diagnostic wake reason report 170c, the data path wake reason report 170d, and/or the PCI bus-based wake reason report 170e are sent to a server or database 185 of an OS producer, in some cases, over network(s) 180. In another example, the client diagnostic wake reason report 170c and/or the PCI bus-based wake reason report 170e are sent to a server or database 190 of an independent hardware vendor ("IHV") associated with the mobile connectivity device 120, in some cases, over network(s) 180. In examples, the processing system(s) 110, the OS 135, and/or the OS control message support driver 140 generates telemetry data 175 based on results contained in at least one of the sleep study report 170a, the control path wake reason report 170b, the client diagnostic wake reason report 170c, the data path wake reason report 170d, the PCI bus-based wake reason report 170e, the mobile connectivity adapter report 160, and/or the net adapter report 165. In examples, the processing system(s) 110, the OS 135, and/or the OS control message support driver 140 subsequently sends the telemetry data 175 to a cloud storage device 195a or to a telemetry data repository 195b, in some cases, over network(s) 180. Network(s) 180 each includes at least one of a distributed computing network, such as the Internet, a private network, a commercial network, or a cloud network, and/or the like.

In operation, the processing system(s) 110, the OS 135, and/or the OS control message support driver 140 performs methods for implementing mobile connectivity device wake detection and diagnosis, as described in detail with respect to FIGS. 2-4D. For example, the example sequence flow 200 as described below with respect to FIG. 2, the example method 300 as described below with respect to FIGS. 3A-3D, and the example method 400 as described below with respect to FIGS. 4A-4D may be applied with respect to the operations of system 100 of FIG. 1.

FIG. 2 depicts an example sequence flow 200 for implementing mobile connectivity device wake detection and diagnosis. The example sequence flow 200 includes processes performed by an OS (e.g., OS 135 of FIG. 1), an OS control message support driver 205 (e.g., OS control message support driver 140), a network data transfer support driver 210 (e.g., network data transfer support driver 150), and a mobile connectivity chipset driver 215 (e.g., mobile connectivity chipset driver 145) of a device (e.g., device 105) during one of three periods: (1) before entry into a fully on and operational power state of the device (referred to herein as "Pre Device DO Entry State 220"); (2) during a period during which a wake state is disarmed (referred to herein as "Disarm Wake State 225"); or (3) after the period during which the wake state is disarmed (referred to herein as "Post Disarm Wake State 230"). In examples, the OS control message support driver 205 corresponds to a Wi-Fi class extension ("WiFiCx") driver or a mobile broadband ("MBB") class extension ("MBBCx"), while the network data transfer support driver 210 corresponds to a network adapter class extension ("NetAdapterCx"), and the mobile connectivity chipset driver 215 corresponds to an IHV Wi-Fi chipset driver or an IHV MBB chipset driver.

At operation 232, the OS receives or detects a control signal, or detects power-up of a mobile connectivity chipset (e.g., mobile connectivity device 120). During the Pre Device DO Entry State 220, the OS control message support driver 205 determines whether the control signal has been received from the OS (at operation 234). Based on a determination that the control signal has been received by the OS, the OS control message support driver 205 continues onto the process related to reporting control path wake reason 256. Based on a determination that the control signal has not been received by the OS, the OS control message support driver 205 continues onto the process related to updating the mobile connectivity adapter report 240.

During the Disarm Wake State 225, the mobile connectivity chipset driver 215 determines, in some cases using a client driver diagnostic system, whether an internal reason is the cause of power-up of the mobile connectivity chipset (at operation 236). In examples, the internal reason includes a firmware-based reason in which a firmware of the mobile connectivity chipset has triggered the mobile connectivity chipset to awaken from a sleep state. Based on a determination that the internal reason is the cause of power-up of the mobile connectivity chipset, the mobile connectivity chipset driver 215 sends data regarding client driver diagnostic wake reason 238 to OS control message support driver 205. The OS control message support driver 205 updates a mobile connectivity adapter report 240 (e.g., mobile connectivity adapter report 160 of FIG. 1) with the client driver diagnostic wake reason 238.

Based on a determination that an internal reason is not the cause of power-up of the mobile connectivity chipset, the mobile connectivity chipset driver 215 determines whether a control path reason is the cause of power-up of the mobile connectivity chipset (at operation 242). Based on a determination that the control path reason is the cause of power-up of the mobile connectivity chipset, the mobile connectivity chipset driver 215 sends data regarding control path wake reason 244 to OS control message support driver 205. The OS control message support driver 205 updates the mobile connectivity adapter report 240 (e.g., mobile connectivity adapter report 160 of FIG. 1) with the control path wake reason 244.

In an example, the control path reason includes a control signal being received by the mobile connectivity chipset driver 215 to awaken or to use the mobile connectivity chipset to send or receive data traffic. In another example, the control path reason includes a signal corresponding to awakening of the mobile connectivity chipset upon detection of handshake errors of a group temporal key ("GTK") or an integrity group temporal key ("IGTK"). Alternatively, the control path reason includes a signal corresponding to awakening of the mobile connectivity chipset upon receipt of an extensible authentication protocol ("EAP") of a port-based network access control ("PNAC") protocol. NAC, as used herein, refers to an approach to computer security that attempts to unify endpoint security technology, user or system authentication, and network security enforcement, where endpoint security technology includes antivirus, host intrusion prevention, and vulnerability assessment. Alternatively, the control path reason includes a signal corresponding to awakening of the mobile connectivity chipset upon receipt of a four-way handshake request. Four-way handshake, as used herein, refers to a type of network authentication protocol that allows an authenticator and a wireless client to establish an encrypted connection without having to reveal their pass keys (e.g., a Pairwise Master Key ("PMK")) to each other. Alternatively, the control path reason includes a signal corresponding to awakening of the mobile connectivity chipset upon a determination that an association with a current access point has been lost. In yet another example, the control path reason includes a turn-on signal for the mobile connectivity chipset that is sent from the OS to the mobile connectivity chipset. Alternatively, the control path reason includes an update received from a server via a notification service. Alternatively, the control path reason includes a signal that a data package for transfer via the mobile connectivity chipset has been received. Alternatively, the control path reason includes a signal containing profile information that is used to scan a subset of available channels for preferred networks, the profile information being compiled using network list offload ("NLO") functionality.

Based on a determination that a control path reason is not the cause of power-up of the mobile connectivity chipset, the mobile connectivity chipset driver 215 determines whether a data path reason is the cause of power-up of the mobile connectivity chipset (at operation 246). In an example, a data path reason includes a data signal being received by the mobile connectivity chipset driver 215 to awaken or to use the mobile connectivity chipset, the data signal including data packets for sending to another device via the mobile connectivity chipset. In some cases, the data signal includes an indication that data packets for transfer are to follow. In another example, the data path reason includes detection or identification of a data path pattern that is known to cause an error of a network data path, the error of the network data path causing the mobile connectivity chipset to awaken. Based on a determination that the data path reason is the cause of power-up of the mobile connectivity chipset, the mobile connectivity chipset driver 215 sends data regarding data path wake reason 248 to network data transfer support driver 210. The network data transfer support driver 210 updates a net adapter report 250 (e.g., net adapter report 165 of FIG. 1) with the data path wake reason 248.

Based on a determination that a data path reason is not the cause of power-up of the mobile connectivity chipset, the mobile connectivity chipset driver 215 continues onto the process at operation 252, at which the mobile connectivity chipset driver 215 reports nothing, reports no reason, or logs a wake event without association with specified wake reasons (as described below). In an example, the mobile connectivity chipset driver 215 reports three types of wake reasons: (a) an internal or firmware-based reason; (b) a control path reason; and (c) a data path reason. In such an example, other types of wake reasons are not reported. In another example, the mobile connectivity chipset driver 215 reports at least three categorized wake reasons: (a) an internal or firmware-based reason; (b) a control path reason; and (c) a data path reason, while other wake events which do not fit in the reporting structure are logged with no categorized reason (e.g., in a sleep study report).

At operation 254, the OS control message support driver 205 determines whether the cause of awakening of the mobile connectivity device includes a control path reason. In examples, the cause of awakening of the mobile connectivity device is determined to be a control path reason based on first information corresponding to an indication that a signal has been received or detected by the mobile connectivity chipset driver 215. In some cases, the first information is accessed from the updated mobile connectivity adapter report 240. Based on a determination that the cause of awakening of the mobile connectivity device includes a control path reason, the OS control message support driver 205 sends a first report indicating that the mobile connectivity device was awakened based on the control path reason (denoted in FIG. 2 by "Report Control Path Wake Reason 256").

At operation 258, the OS control message support driver 205 determines whether the cause of awakening of the mobile connectivity device includes a firmware-based reason associated with the firmware of the mobile connectivity device. In examples, the cause of awakening of the mobile connectivity device is determined to be a firmware-based reason based on second information corresponding to an indication that an internal reason (e.g., a firmware-based reason or a client diagnostic-based reason) has caused the mobile connectivity device to awaken. In some cases, the second information, like the first information, is accessed from the updated mobile connectivity adapter report 240. Based on a determination that the cause of awakening of the mobile connectivity device includes an internal reason or a firmware-based reason, the OS control message support driver 205 sends a second report indicating that the mobile connectivity device was awakened based on the firmware-based reason (denoted in FIG. 2 by "Report Client Diagnostic Wake Reason 260").

During the Post Disarm Wake State 230, at operation 262, the OS control message support driver 205 determines whether the cause of awakening of the mobile connectivity device includes a data path reason. In examples, the cause of awakening of the mobile connectivity device is determined to be a data path reason based on third information corresponding to an indication that a data path pattern has been detected that matches a data path pattern that is known to cause an error of a network data path, the error of the network data path causing the mobile connectivity device to awaken. In some cases, the third information is accessed from the updated net adapter report 250. Based on a determination that the cause of awakening of the mobile connectivity device includes a data path reason associated with a firmware of the mobile connectivity device, the OS control message support driver 205 sends a third report indicating that the mobile connectivity device was awakened based on the data path reason (denoted in FIG. 2 by "Report Data Path Wake Reason 264").

In examples, the cause of awakening of the mobile connectivity device is determined to be a PCI bus-based reason based on a determination that none of the control path reason, the firmware-based reason, or the data path reason are the cause of awakening of the mobile connectivity device. Based on a determination that the cause of awakening of the mobile connectivity device includes a PCI bus-based reason, the OS control message support driver 205 sends a fourth report indicating that the mobile connectivity device was awakened due to another device on the common PCI bus (e.g., other device(s) 125 on PCI bus 130 that is shared with mobile connectivity device 120 of FIG. 1) having been awakened (denoted in FIG. 2 by "Report PCI Bus-based Wake Reason 266").

The various reports are sent to corresponding teams for further action (e.g., analysis of the wake reasons for subsequent system updates or patches to address the underlying issues associated with the wake reasons). For example, the first through fourth reports are sent to a server or database of an OS producer (e.g., server or database 185 of FIG. 1) for further action. In an example, the second and/or the fourth reports are sent to a server or database of an IHV (e.g., server or database 190 associated with the mobile connectivity device 120 of FIG. 1) for further action. These and other functions of the example sequence flow 200 (and its components) are described in greater detail herein with respect to FIGS. 1, 3A-3D, and 4A-4D.

With reference to FIGS. 3A-3D, in some examples, the operations of example method 300 are performed by an OS control message support driver (e.g., OS control message support driver 140 or 205 of FIGS. 1 and 2) running on an OS (e.g., OS 135 of FIG. 1) of a device (e.g., device 105 of FIG. 1). Referring to FIGS. 4A-4D, the operations of example method 400, in some cases, are performed by a first driver (e.g., OS control message support driver 140 or 205 of FIGS. 1 and 2) running on an OS (e.g., OS 135 of FIG. 1) of a computing system (e.g., device 105 or processing system(s) 110 of FIG. 1).

FIGS. 3A-3D depict an example method 300 for implementing mobile connectivity device wake detection and diagnosis. Method 300 of FIG. 3A either continues onto FIG. 3B following the circular marker denoted, "A," continues onto FIG. 3C following the circular marker denoted, "B," or continues onto FIG. 3D following the circular marker denoted, "C."

Figure 3A:
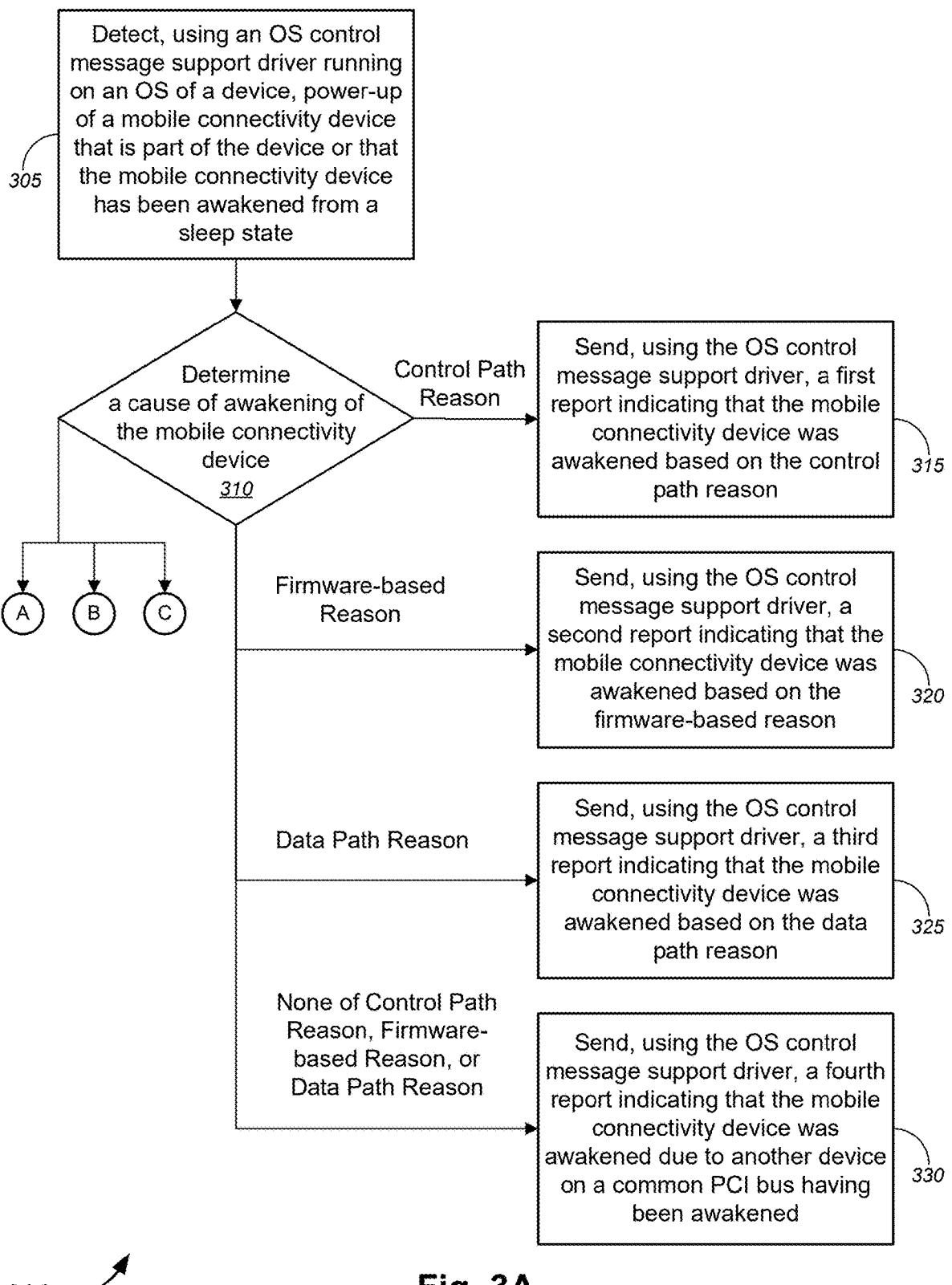

In the example of FIG. 3A, method 300, at operation 305, includes the OS control message support driver detecting power-up of a mobile connectivity device (e.g., mobile connectivity device 120, Wi-Fi chipset 120a, or mobile broadband chipset 120b of FIG. 1) or that the mobile connectivity device has been awakened from a sleep state. After detecting that a mobile connectivity device has been awakened, the OS control message support driver determines a cause of awakening of the mobile connectivity device (at operation 310). At operation 315, based on a determination that the cause of awakening of the mobile connectivity device includes a control path reason, the OS control message support driver sends a first report (e.g., control path wake reason report 170b of FIG. 1) indicating that the mobile connectivity device was awakened based on the control path reason. Alternatively, based on a determination that the cause of awakening of the mobile connectivity device includes a firmware-based reason associated with a firmware of the mobile connectivity device, the OS control message support driver sends a second report (e.g., client diagnostic wake reason report 170c of FIG. 1) indicating that the mobile connectivity device was awakened based on the firmware-based reason (at operation 320). In another alternative case, based on a determination that the cause of awakening of the mobile connectivity device includes a data path reason, the OS control message support driver sends a third report (e.g., data path wake reason report 170d of FIG. 1) indicating that the mobile connectivity device was awakened based on the data path reason (at operation 325). In yet another case, the mobile connectivity device shares a common PCI bus (e.g., PCI bus 130 of FIG. 1) with another device (e.g., other device(s) 125 of FIG. 1). At operation 330, based on a determination that the cause of awakening of the mobile connectivity device includes none of the control path reason, the firmware-based reason, or the data path reason, the OS control message support driver sends a fourth report (e.g., PCI bus-based wake reason report 170e of FIG. 1) indicating that the mobile connectivity device was awakened due to another device on a common PCI having been awakened.

In examples, method 300 either continues onto the process at operation 335 of FIG. 3B following the circular marker denoted, "A," continues onto the process at operation 345 of FIG. 3C following the circular marker denoted, "B," or continues onto the process at operation 350 of FIG. 3D following the circular marker denoted, "C."

At operation 335 in FIG. 3B (following the circular marker denoted, "A," in FIG. 3A), method 300 includes the OS control message support driver generating telemetry data based on results contained in at least one of the first report, the second report, the third report, or the fourth report. Method 300 further includes, at operation 340, the OS control message support driver sending the telemetry data to a cloud storage device (e.g., cloud storage device 195a of FIG. 1) over a network (e.g., network 180 of FIG. 1) or to a telemetry data repository (e.g., telemetry data repository 195b of FIG. 1).

At operation 345 in FIG. 3C (following the circular marker denoted, "B," in FIG. 3A), method 300 includes the OS control message support driver logging, in a sleep study report (e.g., sleep study report 170*a* of FIG. 1) that is stored in a local software trace preprocessor, results that are contained in at least one of the first report, the second report, the third report, or the fourth report.

At operation 350 in FIG. 3D (following the circular marker denoted, "C," in FIG. 3A), method 300 includes causing the OS to initiate preset actions in response to information contained in at least one of the first report, the second report, the third report, the fourth report, the mobile connectivity adapter report, or the net adapter report. In an example, the preset actions include disarming a wake signal or trigger signal for the mobile connectivity device based on a determination, or information indicating, that the mobile connectivity device was awakened due to another device on the common PCI bus having been awakened.

FIGS. 4A-4D depict another example method 400 for implementing mobile connectivity device wake detection and diagnosis. Method 400 of FIG. 4A either continues onto FIG. 4B following the circular marker denoted, "A," continues onto FIG. 4C following the circular marker denoted, "B," or continues onto FIG. 4D following the circular marker denoted, "C."

In the example of FIG. 4A, method 400, at operation 405, includes the first driver detecting power-up of a mobile connectivity chipset (e.g., Wi-Fi chipset 120*a* or mobile broadband chipset 120*b* of FIG. 1) or that the mobile connectivity chipset has been awakened from a sleep state. After detecting that a mobile connectivity chipset has been awakened, the first driver determines a cause of awakening of the mobile connectivity chipset (at operation 410). At operation 415, based on a determination that the cause of awakening of the mobile connectivity chipset includes a control path reason, the first driver sends a first report (e.g., control path wake reason report 170*b* of FIG. 1) indicating that the mobile connectivity chipset was awakened based on the control path reason. Alternatively, based on a determination that the cause of awakening of the mobile connectivity chipset includes a firmware-based reason associated with a firmware of the mobile connectivity chipset, the first driver sends a second report (e.g., client diagnostic wake reason report 170*c* of FIG. 1) indicating that the mobile connectivity chipset was awakened based on the firmware-based reason (at operation 420). In another alternative case, based on a determination that the cause of awakening of the mobile connectivity chipset includes a data path reason, the first driver sends a third report (e.g., data path wake reason report 170*d* of FIG. 1) indicating that the mobile connectivity chipset was awakened based on the data path reason (at operation 425). In yet another case, the mobile connectivity chipset shares a common PCI bus (e.g., PCI bus 130 of FIG. 1) with the other device (e.g., other device(s) 125 of FIG. 1). At operation 430, based on a determination that the cause of awakening of the mobile connectivity chipset includes none of the control path reason, the firmware-based reason, or the data path reason, the first driver sends a fourth report (e.g., PCI bus-based wake reason report 170*e* of FIG. 1) indicating that the mobile connectivity chipset was awakened due to another device on a common PCI having been awakened.

In examples, method 400 either continues onto the process at operation 435 of FIG. 4B following the circular marker denoted, "A," continues onto the process at operation 445 of FIG. 4C following the circular marker denoted, "B," or continues onto the process at operation 450 of FIG. 4D following the circular marker denoted, "C."

At operation 435 in FIG. 4B (following the circular marker denoted, "A," in FIG. 4A), method 400 includes the first driver generating telemetry data based on results contained in at least one of the first report, the second report, the third report, or the fourth report. Method 400 further includes, at operation 440, the first driver sending the telemetry data to a cloud storage device (e.g., cloud storage device 195*a* of FIG. 1) over a network (e.g., network 180 of FIG. 1) or to a telemetry data repository (e.g., telemetry data repository 195*b* of FIG. 1).

At operation 445 in FIG. 4C (following the circular marker denoted, "B," in FIG. 4A), method 400 includes the first driver logging, in a sleep study report (e.g., sleep study report 170*a* of FIG. 1) that is stored in a local software trace preprocessor, results that are contained in at least one of the first report, the second report, the third report, or the fourth report.

At operation 450 in FIG. 4D (following the circular marker denoted, "C," in FIG. 4A), method 400 includes causing the OS to initiate preset actions in response to information contained in at least one of the first report, the second report, the third report, the fourth report, the mobile connectivity adapter report, or the net adapter report. In an example, the preset actions include disarming a wake signal or trigger signal for mobile connectivity chipset based on a determination, or information indicating, that the mobile connectivity chipset was awakened due to another device on the common PCI bus having been awakened.

In FIGS. 3A-3D and 4A-4D, determining the cause of awakening of the mobile connectivity device (at operation 310) or of the mobile connectivity chipset (at operation 410) are similar, if not identical, to the processes as described above with respect to the example sequence flow 200 of FIG. 2.

While the techniques and procedures in methods 300, 400 are depicted and/or described in a certain order for purposes of illustration, it should be appreciated that certain procedures may be reordered and/or omitted within the scope of various embodiments. Moreover, while the methods 300, 400 may be implemented by or with (and, in some cases, are described below with respect to) the systems, examples, or embodiments 100 and 200 of FIGS. 1 and 2, respectively (or components thereof), such methods may also be implemented using any suitable hardware (or software) implementation. Similarly, while each of the systems, examples, or embodiments 100 and 200 of FIGS. 1 and 2, respectively (or components thereof), can operate according to the methods 300, 400 (e.g., by executing instructions embodied on a computer readable medium), the systems, examples, or embodiments 100 and 200 of FIGS. 1 and 2 can each also operate according to other modes of operation and/or perform other suitable procedures.

As should be appreciated from the foregoing, the present technology provides multiple technical benefits and solutions to technical problems. For instance, using a mobile connectivity chipset on a battery-powered user device generally raises some technical problems. For example, one technical problem includes some mobile connectivity chipsets being susceptible to high counts of suspicious wake instances during modern standby sessions, which result in bad battery performance, which can be exacerbated by background operations that continue to use data transfer channels during wake sessions (even if unintended wake sessions are initiated). The present technology provides for implementing mobile connectivity device wake detection and diagnosis, which resolves these issues by enabling quick triage of wake reasons that trigger awakening of mobile connectivity devices or chipsets (e.g., a Wi-Fi chipset or a mobile broadband chipset), including quick triage of battery saver issues associated with suspicious wake triggers. That is, the triage flow includes determining a cause of awakening of the mobile connectivity device, updating an appropriate report (e.g., a mobile connectivity adapter report, a net adapter report, and/or a sleep study report), and sending corresponding wake reason reports based on information obtained from the updated appropriate reports. The wake reason reports include a control path wake reason report, a client diagnostic or firmware-based wake reason report, a data path wake reason report, or a PCI bus-based wake reason report. In this manner, timely and accurate classification and investigation into issues related to standby performance or wake triggers for mobile connectivity devices can be implemented and appropriate reports can be sent to corresponding teams to perform further action (e.g., analysis of the wake reasons for subsequent system updates or patches to address the underlying issues associated with the wake reasons). This ultimately results in energy savings, enhanced reliability of the device and the mobile connectivity device/chipset, and improved battery performance.

Figure 5:
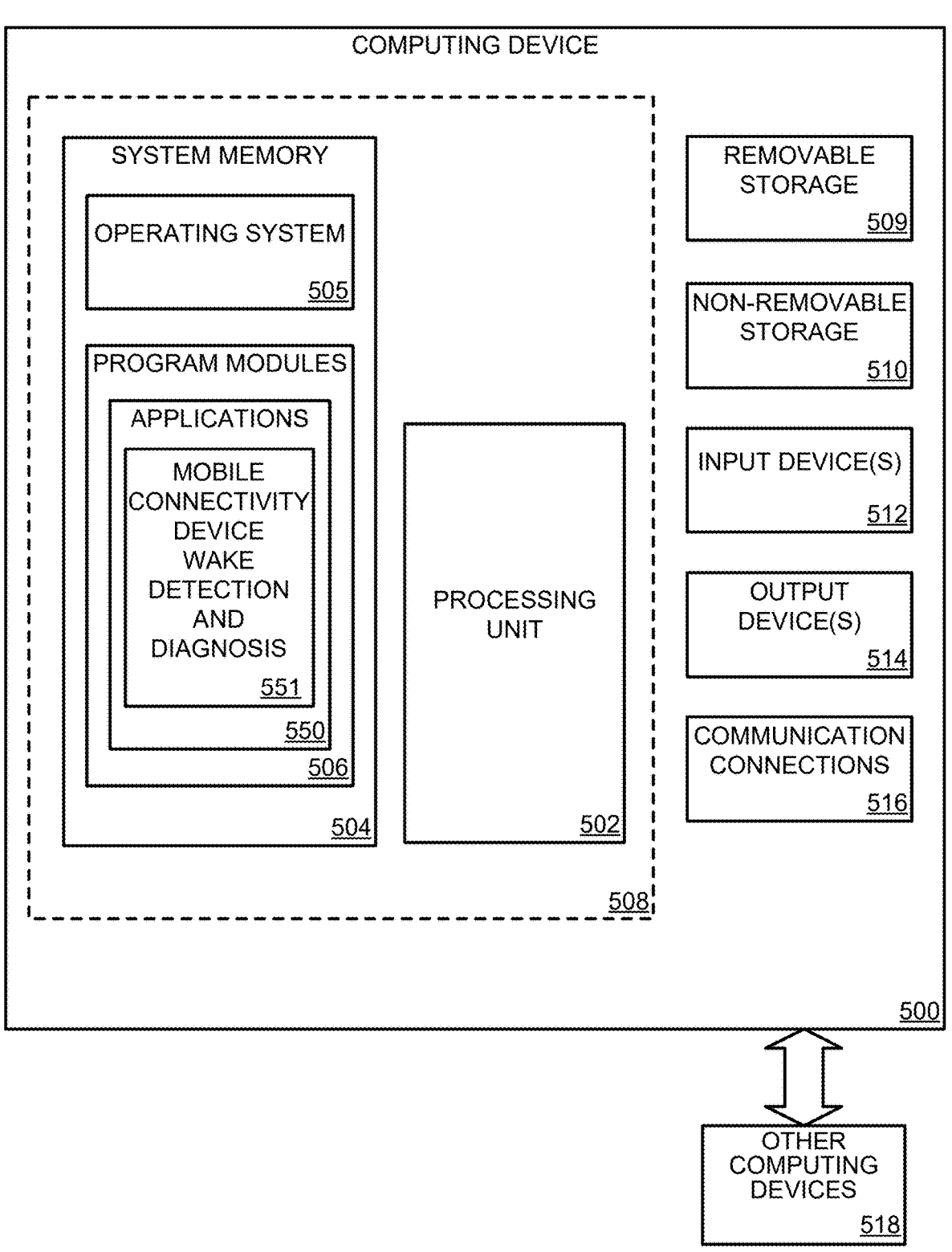
FIG. 5 depicts a block diagram illustrating example physical components of a computing device with which aspects of the technology may be practiced.

FIG. 5 depicts a block diagram illustrating physical components (i.e., hardware) of a computing device 500 with which examples of the present disclosure may be practiced. The computing device components described below may be suitable for a client device implementing the mobile connectivity device wake detection and diagnosis, as discussed above. In a basic configuration, the computing device 500 may include at least one processing unit 502 and a system memory 504. The processing unit(s) (e.g., processors) may be referred to as a processing system. Depending on the configuration and type of computing device, the system memory 504 may include volatile storage (e.g., random access memory), non-volatile storage (e.g., read-only memory), flash memory, or any combination of such memories. The system memory 504 may include an operating system 505 and one or more program modules 506 suitable for running software applications 550, such as mobile connectivity device wake detection and diagnosis 551, to implement one or more of the systems or methods described above.

The operating system 505, for example, may be suitable for controlling the operation of the computing device 500. Furthermore, aspects of the invention may be practiced in conjunction with a graphics library, other operating systems, or any other application program and is not limited to any particular application or system. This basic configuration is illustrated in FIG. 5 by those components within a dashed line 508. The computing device 500 may have additional features or functionalities. For example, the computing device 500 may also include additional data storage devices (which may be removable and/or non-removable), such as, for example, magnetic disks, optical disks, or tape. Such additional storage is illustrated in FIG. 5 by a removable storage device(s) 509 and a non-removable storage device(s) 510.

As stated above, a number of program modules and data files may be stored in the system memory 504. While executing on the processing unit 502, the program modules 506 may perform processes including one or more of the operations of the method(s) as illustrated in FIGS. 3A-4D, or one or more operations of the system(s) and/or apparatus(es) as described with respect to FIGS. 1 and 2, or the like. Other program modules that may be used in accordance with examples of the present disclosure may include applications such as electronic mail and contacts applications, word processing applications, spreadsheet applications, database applications, slide presentation applications, drawing or computer-aided application programs, artificial intelligence ("AI") applications and machine learning ("ML") modules on cloud-based systems, etc.

Furthermore, examples of the present disclosure may be practiced in an electrical circuit including discrete electronic elements, packaged or integrated electronic chips containing logic gates, a circuit utilizing a microprocessor, or on a single chip containing electronic elements or microprocessors. For example, examples of the present disclosure may be practiced via a system-on-a-chip ("SOC") where each or many of the components illustrated in FIG. 5 may be integrated onto a single integrated circuit. Such an SOC device may include one or more processing units, graphics units, communications units, system virtualization units and various application functionalities all of which may be integrated (or "burned") onto the chip substrate as a single integrated circuit. When operating via an SOC, the functionality, described herein, with respect to generating suggested queries, may be operated via application-specific logic integrated with other components of the computing device 500 on the single integrated circuit (or chip). Examples of the present disclosure may also be practiced using other technologies capable of performing logical operations such as, for example, AND, OR, and NOT, including mechanical, optical, fluidic, and/or quantum technologies.

The computing device 500 may also have one or more input devices 512 such as a keyboard, a mouse, a pen, a sound input device, and/or a touch input device, etc. The output device(s) 514 such as a display, speakers, and/or a printer, etc. may also be included. The aforementioned devices are examples and others may be used. The computing device 500 may include one or more communication connections 516 allowing communications with other computing devices 518. Examples of suitable communication connections 516 include radio frequency ("RF") transmitter, receiver, and/or transceiver circuitry; universal serial bus ("USB"), parallel, and/or serial ports; and/or the like.

The term "computer readable media" as used herein may include computer storage media. Computer storage media may include volatile and nonvolatile, and/or removable and non-removable, media that may be implemented in any method or technology for storage of information, such as computer readable instructions, data structures, or program modules. The system memory 504, the removable storage device 509, and the non-removable storage device 510 are all computer storage media examples (i.e., memory storage). Computer storage media may include random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media may be non-transitory and tangible, and computer storage media do not include a carrier wave or other propagated data signal.

Communication media may be embodied by computer readable instructions, data structures, program modules, or other data in a modulated data signal, such as a carrier wave or other transport mechanism, and may include any information delivery media. The term "modulated data signal" may describe a signal that has one or more characteristics that are set or changed in such a manner as to encode information in the signal. By way of example, communication media may include wired media such as a wired network or direct-wired connection, and wireless media such as acoustic, RF, infrared, and other wireless media.

In this detailed description, wherever possible, the same reference numbers are used in the drawing and the detailed description to refer to the same or similar elements. In some instances, a sub-label is associated with a reference numeral to denote one of multiple similar components. When reference is made to a reference numeral without specification to an existing sub-label, it is intended to refer to all such multiple similar components. In some cases, for denoting a plurality of components, the suffixes "a" through "n" may be used, where n denotes any suitable non-negative integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 X05a-X05n, the integer value of n in X05n may be the same or different from the integer value of n in X10n for component #2 X10a-X10n, and so on. In other cases, other suffixes (e.g., s, t, u, v, w, x, y, and/or z) may similarly denote non-negative integer numbers that (together with n or other like suffixes) may be either all the same as each other, all different from each other, or some combination of same and different (e.g., one set of two or more having the same values with the others having different values, a plurality of sets of two or more having the same value with the others having different values).

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

In this detailed description, for the purposes of explanation, numerous specific details are set forth to provide a thorough understanding of the described embodiments. It will be apparent to one skilled in the art, however, that other embodiments of the present invention may be practiced without some of these specific details. In other instances, certain structures and devices are shown in block diagram form. While aspects of the technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the detailed description does not limit the technology, but instead, the proper scope of the technology is defined by the appended claims. Examples may take the form of a hardware implementation, or an entirely software implementation, or an implementation combining software and hardware aspects. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features. The detailed description is, therefore, not to be taken in a limiting sense.

Aspects of the present invention, for example, are described above with reference to block diagrams and/or operational illustrations of methods, systems, and computer program products according to aspects of the invention. The functions and/or acts noted in the blocks may occur out of the order as shown in any flowchart. For example, two blocks shown in succession may in fact be executed substantially concurrently or the blocks may sometimes be executed in the reverse order, depending upon the functionalities and/or acts involved. Further, as used herein and in the claims, the phrase "at least one of element A, element B, or element C" (or any suitable number of elements) is intended to convey any of: element A, element B, element C, elements A and B, elements A and C, elements B and C, and/or elements A, B, and C (and so on).

The description and illustration of one or more aspects provided in this application are not intended to limit or restrict the scope of the invention as claimed in any way. The aspects, examples, and details provided in this application are considered sufficient to convey possession and enable others to make and use the best mode of the claimed invention. The claimed invention should not be construed as being limited to any aspect, example, or detail provided in this application. Regardless of whether shown and described in combination or separately, the various features (both structural and methodological) are intended to be selectively rearranged, included, or omitted to produce an example or embodiment with a particular set of features. Having been provided with the description and illustration of the present application, one skilled in the art may envision variations, modifications, and alternate aspects, examples, and/or similar embodiments falling within the spirit of the broader aspects of the general inventive concept embodied in this application that do not depart from the broader scope of the claimed invention.

What is claimed is:

1. A computing system, comprising:
   a mobile connectivity chipset;
   a processing system; and
   memory coupled to the processing system, the memory comprising computer executable instructions that, when executed by the processing system, causes the computing system to perform operations comprising:
      detecting, using a first driver running on an operating system ("OS") of the computing system, that the mobile connectivity chipset has been awakened from a sleep state;
      determining, using the first driver, a cause of awakening of the mobile connectivity chipset; and
      performing one of:
         based on a determination that the cause of awakening of the mobile connectivity chipset includes a control path reason, sending a first report indicating that the mobile connectivity chipset was awakened based on the control path reason;

based on a determination that the cause of awakening of the mobile connectivity chipset includes a firmware-based reason associated with a firmware of the mobile connectivity chipset, sending a second report indicating that the mobile connectivity chipset was awakened based on the firmware-based reason; or based on a determination that the cause of awakening of the mobile connectivity chipset includes a data path reason, sending a third report indicating that the mobile connectivity chipset was awakened based on the data path reason.

2. The computing system of claim 1, wherein the mobile connectivity chipset includes one of a Wi-Fi chipset or a mobile broadband chipset each associated with an independent hardware vendor ("IHV"), wherein the one of the Wi-Fi chipset or the mobile broadband chipset has an associated mobile connectivity chipset driver, wherein the first driver is an OS control message support driver that communicates with the mobile connectivity chipset via the mobile connectivity chipset driver.

3. The computing system of claim 2, wherein determining the cause of awakening of the mobile connectivity chipset comprises:

receiving, using the OS control message support driver and from the mobile connectivity chipset driver, an indication that a first signal has been received or detected by the mobile connectivity chipset driver; and determining, using the OS control message support driver, that the cause of awakening of the mobile connectivity chipset includes the control path reason based on the indication that the first signal has been received or detected by the mobile connectivity chipset driver.

4. The computing system of claim 3, wherein the first signal corresponds to one of:

awakening of the mobile connectivity chipset upon detection of handshake errors of a group temporal key ("GTK") or an integrity group temporal key ("IGTK");

awakening of the mobile connectivity chipset upon receipt of an extensible authentication protocol ("EAP") of a port-based network access control ("PNAC") protocol;

awakening of the mobile connectivity chipset upon receipt of a four-way handshake request; or awakening of the mobile connectivity chipset upon a determination that an association with a current access point has been lost.

5. The computing system of claim 3, wherein the first signal corresponds to one of:

a turn-on signal for the mobile connectivity chipset that is sent from the OS to the mobile connectivity chipset;

an update received from a server via a notification service;

a signal that a data package for transfer via the mobile connectivity chipset has been received; or a signal containing profile information that is used to scan a subset of available channels for preferred networks, the profile information being compiled using network list offload ("NLO") functionality.

6. The computing system of claim 3, wherein determining the cause of awakening of the mobile connectivity chipset further comprises:

updating a mobile connectivity adapter report with a control path wake reason based on first information corresponding to the indication that the first signal has been received or detected by the mobile connectivity chipset driver;

wherein determining that the cause of awakening of the mobile connectivity chipset includes the control path reason is based on the first information corresponding to the indication that the first signal has been received or detected by the mobile connectivity chipset driver, the first information being accessed from the mobile connectivity adapter report.

7. The computing system of claim 6, wherein determining the cause of awakening of the mobile connectivity chipset further comprises:

receiving, using the OS control message support driver and from the mobile connectivity chipset driver, an indication that an internal reason has caused the mobile connectivity chipset to awaken;

updating the mobile connectivity adapter report with a firmware-based wake reason based on second information corresponding to the indication that the internal reason has caused the mobile connectivity chipset to awaken; and determining, using the OS control message support driver, that the cause of awakening of the mobile connectivity chipset includes the firmware-based reason based on the second information corresponding to the indication that the internal reason has caused the mobile connectivity chipset to awaken.

8. The computing system of claim 7, wherein determining the cause of awakening of the mobile connectivity chipset further comprises:

receiving, using a network data transfer support driver and from the mobile connectivity chipset driver, an indication that a data path pattern has been detected that matches a data path pattern that is known to cause an error of a network data path, the error of the network data path causing the mobile connectivity chipset to awaken;

updating, by the network data transfer support driver, a net adapter report with a data path-based wake reason based on third information corresponding to the indication that the data path pattern has been detected that matches the data path pattern that is known to cause the error of the network data path;

receiving, using the OS control message support driver and from the network data transfer support driver, an indication that the data path reason has caused the mobile connectivity chipset to awaken based on the data path-based wake reason; and determining, using the OS control message support driver, that the cause of awakening of the mobile connectivity chipset includes the data path reason based on fourth information corresponding to the indication that the data path reason has caused the mobile connectivity chipset to awaken.

9. The computing system of claim 8, wherein the mobile connectivity chipset shares a peripheral component interconnect ("PCI") bus with another device, wherein determining the cause of awakening of the mobile connectivity chipset further comprises:

determining, using the OS control message support driver, that the cause of awakening of the mobile connectivity chipset includes none of the control path reason, the firmware-based reason, or the data path reason; and sending a fourth report indicating that the mobile connectivity chipset was awakened due to another device on the PCI bus having been awakened.

10. The computing system of claim 9, wherein the operations further comprise:

generating telemetry data based on results contained in at least one of the first report, the second report, the third report, the fourth report, the mobile connectivity adapter report, or the net adapter report; and sending the telemetry data to a cloud storage device over a network or to a telemetry data repository.

11. The computing system of claim 9, wherein the operations further comprise:

logging, in a sleep study report that is stored in a local software trace preprocessor, results contained in at least one of the first report, the second report, the third report, the fourth report, the mobile connectivity adapter report, or the net adapter report.

12. The computing system of claim 9, wherein the operations further comprise:

causing the OS to initiate preset actions in response to information contained in at least one of the first report, the second report, the third report, the fourth report, the mobile connectivity adapter report, or the net adapter report.

13. A computer-implemented method, comprising:

detecting, using a first driver running on an operating system ("OS") of a device, power-up of a mobile connectivity device that is part of the device;

determining, using the first driver, a cause of awakening of the mobile connectivity device; and performing one of:

based on a determination that the cause of awakening of the mobile connectivity device includes a control path reason, sending, using the first driver, a first report indicating that the mobile connectivity device was awakened based on the control path reason;

based on a determination that the cause of awakening of the mobile connectivity device includes a firmware-based reason associated with a firmware of the mobile connectivity device, sending, using the first driver, a second report indicating that the mobile connectivity device was awakened based on the firmware-based reason;

based on a determination that the cause of awakening of the mobile connectivity device includes a data path reason, sending, using the first driver, a third report indicating that the mobile connectivity device was awakened based on the data path reason; or based on a determination that the cause of awakening of the mobile connectivity device includes none of the control path reason, the firmware-based reason, or the data path reason, sending, using the first driver, a fourth report indicating that the mobile connectivity device was awakened due to another device on a common peripheral component interconnect ("PCI") bus having been awakened, the common PCI bus being shared by the mobile connectivity device and the other device.

14. The computer-implemented method of claim 13, wherein the mobile connectivity device includes one of a Wi-Fi chipset or a mobile broadband chipset each associated with an independent hardware vendor ("IHV"), wherein the one of the Wi-Fi chipset or the mobile broadband chipset has an associated mobile connectivity device driver, wherein the first driver is an OS control message support driver that communicates with the mobile connectivity device via the mobile connectivity device driver.

15. The computer-implemented method of claim 14, wherein determining the cause of awakening of the mobile connectivity device comprises:

receiving, using the OS control message support driver and from the mobile connectivity device driver, an indication that a first signal has been received or detected by the mobile connectivity device driver;

updating, using the OS control message support driver, a mobile connectivity adapter report with a control path wake reason based on first information corresponding to the indication that the first signal has been received or detected by the mobile connectivity device driver; and determining, using the OS control message support driver, that the cause of awakening of the mobile connectivity device includes the control path reason based on the first information corresponding to the indication that the first signal has been received or detected by the mobile connectivity device driver, the first information being accessed from the mobile connectivity adapter report.

16. The computer-implemented method of claim 15, wherein determining the cause of awakening of the mobile connectivity device comprises:

receiving, using the OS control message support driver and from the mobile connectivity device driver, an indication that an internal reason has caused the mobile connectivity device to awaken;

updating, using the OS control message support driver, the mobile connectivity adapter report with a firmware-based wake reason based on second information corresponding to the indication that the internal reason has caused the mobile connectivity device to awaken; and determining, using the OS control message support driver, that the cause of awakening of the mobile connectivity device includes the firmware-based reason based on the second information corresponding to the indication that the internal reason has caused the mobile connectivity device to awaken.

17. The computer-implemented method of claim 14, wherein determining the cause of awakening of the mobile connectivity device comprises:

receiving, using a network data transfer support driver and from the mobile connectivity device driver, an indication that a data path pattern has been detected that matches a data path pattern that is known to cause an error of a network data path, the error of the network data path causing the mobile connectivity device to awaken;

updating, by the network data transfer support driver, a net adapter report with a data path-based wake reason based on third information corresponding to the indication that the data path pattern has been detected that matches the data path pattern that is known to cause the error of the network data path;

receiving, using the OS control message support driver and from the network data transfer support driver, an indication that the data path reason has caused the mobile connectivity device to awaken based on the data path-based wake reason; and determining, using the OS control message support driver, that the cause of awakening of the mobile connectivity device includes the data path reason based on fourth information corresponding to the indication that the data path reason has caused the mobile connectivity device to awaken.

18. The computer-implemented method of claim 14, further comprising:

generating, using the OS control message support driver, telemetry data based on results contained in at least one of the first report, the second report, the third report, or the fourth report; and sending, using the OS control message support driver, the telemetry data to a cloud storage device over a network or to a telemetry data repository.

19. The computer-implemented method of claim 14, further comprising:

logging, using the OS control message support driver and in a sleep study report that is stored in a local software trace preprocessor, results contained in at least one of the first report, the second report, the third report, or the fourth report.

20. A device, comprising:

a mobile connectivity device;

a processing system; and memory coupled to the processing system, the memory comprising computer executable instructions that, when executed by the processing system, causes the device to perform operations comprising:

detecting, using an operating system ("OS") control message support driver running on an OS of the device, power-up of the mobile connectivity device or that the mobile connectivity device has been awakened from a sleep state;

determining, using the OS control message support driver, a cause of awakening of the mobile connectivity device; and performing one of:

based on a determination that the cause of awakening of the mobile connectivity device includes a control path reason, sending, using the OS control message support driver, a first report indicating that the mobile connectivity device was awakened based on the control path reason;

based on a determination that the cause of awakening of the mobile connectivity device includes a firmware-based reason associated with a firmware of the mobile connectivity device, sending, using the OS control message support driver, a second report indicating that the mobile connectivity device was awakened based on the firmware-based reason;

based on a determination that the cause of awakening of the mobile connectivity device includes a data path reason, sending, using the OS control message support driver, a third report indicating that the mobile connectivity device was awakened based on the data path reason; or based on a determination that the cause of awakening of the mobile connectivity device includes none of the control path reason, the firmware-based reason, or the data path reason, sending, using the OS control message support driver, a fourth report indicating that the mobile connectivity device was awakened due to another device on a common peripheral component interconnect ("PCI") bus having been awakened, the common PCI bus being shared by the mobile connectivity device and the other device.

* * * * *